(12) United States Patent
Sullivan et al.

(10) Patent No.:  US 12,566,860 B2
(45) Date of Patent:       Mar. 3, 2026

(54) STATIC-DYNAMIC INTEGRATION

(71) Applicant: MICRO FOCUS LLC, Santa Clara, CA (US)

(72) Inventors: Gerald E. Sullivan, Roswell, GA (US); Justin Michael Alwine, Alpharetta, GA (US); Peter Thomas Blay, Santa Clara, CA (US); Nidhi Govindram Kejriwal, Pleasanton, CA (US)

(73) Assignee: Micro Focus LLC, Santa Clara, CA (US)

( * ) Notice: Subject to any disclaimer, the term of this patent is extended or adjusted under 35 U.S.C. 154(b) by 805 days.

(21) Appl. No.: 17/552,322

(22) Filed: Dec. 15, 2021

(65) Prior Publication Data

US 2023/0185922 A1      Jun. 15, 2023

(51) Int. Cl.
| | |
|---|---|
| *G06F 21/00* | (2013.01) |
| *G06F 8/71* | (2018.01) |
| *G06F 8/75* | (2018.01) |
| *G06F 11/3668* | (2025.01) |
| *G06F 16/955* | (2019.01) |
| *G06F 21/57* | (2013.01) |

(52) U.S. Cl.
CPC ............. *G06F 21/577* (2013.01); *G06F 8/71* (2013.01); *G06F 8/75* (2013.01); *G06F 11/3688* (2013.01); *G06F 16/955* (2019.01); *G06F 2221/033* (2013.01)

(58) Field of Classification Search
CPC . G06F 21/577; G06F 8/71; G06F 8/75; G06F 11/3688; G06F 16/955; G06F 2221/033; G06F 11/3604; G06F 11/3612
See application file for complete search history.

(56) References Cited

U.S. PATENT DOCUMENTS

| | | | | |
|---|---|---|---|---|
| 8,479,161 | B2 | 7/2013 | Weigert | |
| 9,792,443 | B1 | 10/2017 | Sheridan | |
| 2011/0030061 | A1* | 2/2011 | Artzi | G06F 11/3604 |
| | | | | 714/38.1 |
| 2015/0096006 | A1* | 4/2015 | Chu | H04L 67/1001 |
| | | | | 726/9 |
| 2015/0156216 | A1* | 6/2015 | Brake | H04L 63/1433 |
| | | | | 726/25 |
| 2020/0026851 | A1* | 1/2020 | Dhankha | G06F 21/53 |
| 2020/0097587 | A1* | 3/2020 | Klein | G06F 16/2462 |
| 2020/0401702 | A1 | 12/2020 | Karabatis et al. | |

* cited by examiner

*Primary Examiner* — Jeffrey C Pwu
*Assistant Examiner* — Helai Salehi
(74) *Attorney, Agent, or Firm* — Sheridan Ross P.C.

(57) ABSTRACT

Testing software applications often requires a balancing of thoroughness versus the time and computing resources available to perform such tests. By performing a static analysis on candidate software source code and, from the static analysis, configuring a dynamic analysis component to execute the tests, allows for extraneous tests to be omitted. For example, performing certain vulnerability attacks on a function may be futile if the attack requires a string input but the function only accepts integers. By combining static and dynamic analysis, unnecessary tests may be omitted and the results of each analysis process correlated to identify actual vulnerabilities or falsely indicted vulnerabilities reported by one of the static or dynamic analysis component.

18 Claims, 6 Drawing Sheets

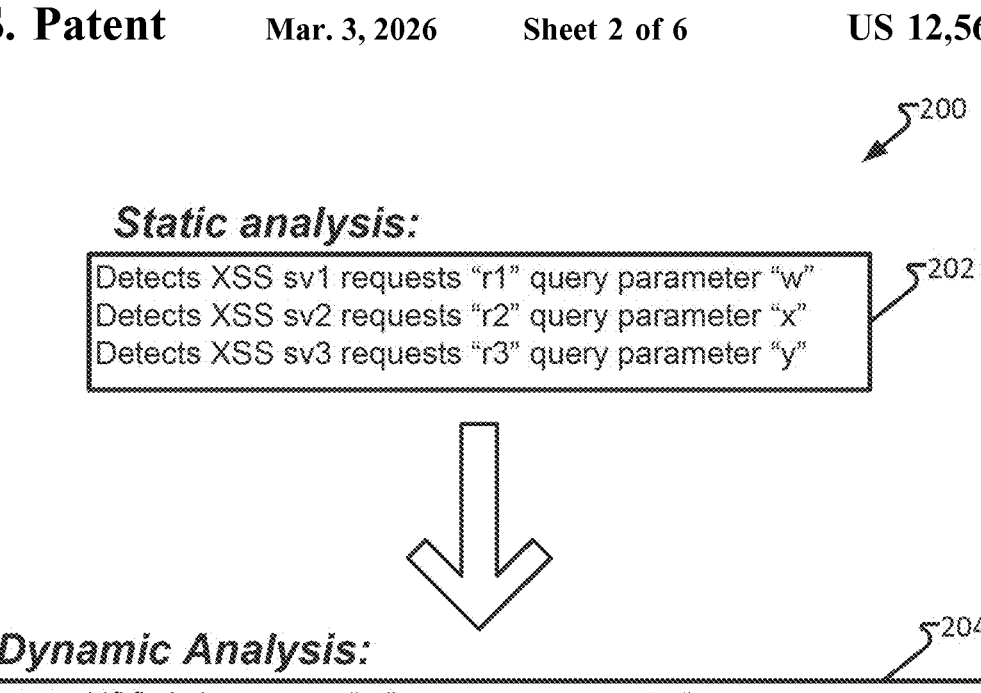

*Static analysis:*

202
Detects XSS sv1 requests "r1" query parameter "w"
Detects XSS sv2 requests "r2" query parameter "x"
Detects XSS sv3 requests "r3" query parameter "y"

*Dynamic Analysis:*
204
Detects XSS dv1 requests "r1" query parameter "w"
Detects XSS dv2 requests "r4" query parameter "a"
Detects XSS dv3 requests "r5" query parameter "b"

Request "r2" query parameter "x" is tested -> no vulnerability determined
Request "r3" query parameter "y" is not found, tested, or detected

*Static-Dynamic Integration detects 1 correlation:*
206
sv1 ⇔dv1

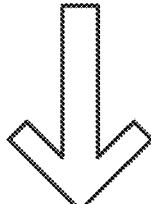

200

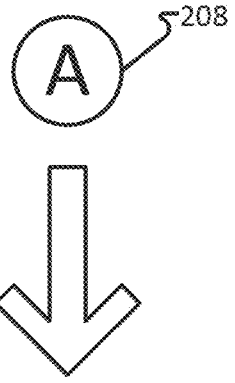

208

*Static-Dynamic Integration results:*

210 sv1/dv1 is vulnerability is confirmed – dynamic analysis does not have a false positives for this type of vulnerability. Static analysis determined a vulnerability.

sv2 is a static false positive and/or dv2 is dynamic false negative due to dynamic testing not detecting a vulnerability.

sv3 is dynamic analysis false negative, indicating a failure in attack surface discovery (crawling)

dv2, dv3 are static analysis false negatives.

*Fig. 2B*

_500

```
[HttpGet]
[Route("/scans/{scanId}/alerts/{alertName}")]
public Task<IEnumerable<ScanLogDescriptor>> AlertsGet([FromUri] Guid
scanId, [FromUri] AlertName alertName, [FromUri] bool? activeOnly = null)
{...}
```

_502

```
Discovered from the above source code:
     1. API can be invoked with:
          HTTP GET with URL of http://<HOST>/scans/<scanId>/alerts/
<alertName>?activeOnly=<b>

2. <scanId> is Guid type, <alertName> is an enum type, and b is bool
type
```

Fig. 5

STATIC-DYNAMIC INTEGRATION

FIELD OF THE DISCLOSURE

The invention relates generally to systems and methods for detecting and managing vulnerabilities in software and particularly to automated assessment of software risks optimized to reduce false positives and false negatives.

BACKGROUND

Software testing is often comprised of two components: a static component that tests source code, and a dynamic component that tests the execution of an executable version of the source code. Each of which have advantages and disadvantages. Dynamic code analysis may identify eternally exposed vulnerabilities with unknown relationship to the application source code, which may comprise executing the code and inserting attacks to determine how the host system responds. Dynamic code analysis is designed to test a running application for potentially exploitable vulnerabilities. However, performing dynamic code analysis may be performance limited as most work and/or time in a typical dynamic scan involves injecting malicious payloads into HTTP requests.

Unlike dynamic code analysis, the static code analysis does not require access to a complete executable but rather inspects the source code of the application for vulnerabilities. By building a model of the execution flow of the application and applying rules to the model, source code analysis (SCA) can detect injection, buffer overflows, and similar vulnerabilities. Static code analysis commonly refers to the running of static code analysis tools that attempt to highlight possible vulnerabilities within 'static' (non-running) source code by using techniques such as data flow analysis. Static code analysis techniques include data flow analysis, control flow graph, taint analysis, and lexical analysis.

Static code analysis of source code can identify specific source code elements with vulnerabilities. False positives are inherent to static code analysis. No attack surface is derived from the static scan. The end result is that static and dynamic scans of a common application provide the customer with two unrelatable collections of vulnerabilities.

SUMMARY

The pages of a web application contain links, each of which are hyperlinked to a uniform resource locator (URL). The HTTP code comprises links that map to linked source codes from linked functions. While dynamic code analysis may scan all of the links for vulnerabilities, the dynamic code analysis produces results from the dynamic code scanner that fails to consider certain vulnerabilities, such as futile attacks, certain attack surfaces, and attacks on path parameters. Static code analysis scans the source code and applies attack surface parameter types that correspond to those vulnerabilities, in order to identify vulnerabilities in the scanned code. Because static code analysis scans the source code without access to the HTTP mapping information, the static code analysis produces results of the static code scanner that can provide false positives as it fails to consider that certain functions are unreachable.

Only certain data types can be vulnerable to certain attacks. For example, an integer request parameter of an HTTP request cannot be vulnerable to a Structured Query Language Injection (SQLI), or cross-site script (XSS) attack.

For example, the host may simply recognize the type-mismatch and ignore the operation or report the non-integer parameter as an error. An "attack surface" represents the sum of all the different points, system elements, and endpoints where an unauthorized user (e.g., an attacker) may be able to enter or extract data. Attack surface discovery is an inherent problem of dynamic scanning, which requires an attack surface. The attack surface must be either configured by a user, or discovered. An Application Programming Interface (API) to be scanned is often difficult and error prone as many APIs are not documented and/or are not designed to be discovered.

These and other needs are addressed by the various embodiments and configurations of the present invention. The present invention can provide a number of advantages depending on the particular configuration. These and other advantages will be apparent from the disclosure of the invention(s) contained herein.

Embodiments herein are generally directed to identifying, comprehensively and effectively, vulnerabilities in hyperlinked web pages that are absent from the prior art. In one embodiment, static and dynamic vulnerabilities are correlated in order to use static information to modify and improve the dynamic scan by mapping static HTTP to source code to improve static results. In one embodiment, mapping of HTTP requests to server code is by framework specific convention, static code attributes, or configuration files. The mapping may be determined by examining source or configuration.

Generally, and in one embodiment, static code analysis is combined with dynamic code analysis. The results are filtered based on the correlation of the static code analysis results against the dynamic code analysis results. Dynamically testing software may comprise executing code and inserting attacks into the execution of the code, such as in an HTTP "GET" or HTTP "POST" request parameter, in order to determine which attacks are successful and represent a vulnerability in the software, and which attacks are unsuccessful and represent one particular attack to which there is no vulnerability. Exhaustive testing of all known combinations of attacks on even a small web-based application can produce a near infinite number of tests. Even with the advances in computing performance, each test requires computing resources in order to execute. Therefore, eliminating attacks that test known or discovered, non-vulnerable attack vectors of an attack surface, improves software testing speed, reduces utilization of testing resources, and/or allows for additional testing, such as to find actual vulnerabilities when the time and/or resources used to test software is fixed and not diluted with operations to test for vulnerabilities in known non-vulnerable attack vectors.

In one embodiment, the static code scanner produces a configuration file (e.g., the attack surface parameter types and vulnerabilities of static code analysis) which is then used by the dynamic code scanner to map dynamically generated and configured HTTP request parameters to static vulnerabilities and data types. Static code analysis typically does not generate any information unrelated to a vulnerability.

The statically discoverable data, useful by the dynamic scanning operations, may include one or more of: HTTP to source code mappings that can be used to generate an attack surface; configure-path parameters; discover HTTP parameter type information, such as to reduce or eliminate futile attacks; HTTP parameter vulnerabilities, used for static-dynamic correlation; and framework information, used to leverage a dynamic scan smart-scan feature to disable futile attacks. For example, Active Server Pages (ASP)-specific attacks are useless for non-ASP frameworks.

In another embodiment, the dynamic code scanner scans the HTTP code for links and applies the statically discovered data (e.g., attack surface parameter types and vulnerabilities of static code analysis) to expose attack surface and vulnerabilities in unpublished links. Specifically, the dynamic code scanner utilizes the configuration file generated by the static code scan to specify statically known information for request parameters (e.g., URL, Header, Cookie, Post data, Query data) data type and vulnerabilities for any dynamically generated, or configured HTTP request. Additionally or alternatively, the dynamic code scanner will correlate or confirm static vulnerabilities if a dynamic vulnerability is found on the same parameter as a static code vulnerability. In another embodiment, the correlated dynamic vulnerabilities will be tagged with static code analysis identification data. Embodiments of the dynamic code scanner can perform one or more of: auditing all HTTP parameters and assume all HTTP parameters injectable with an attack; audit only type-compatible HTTP parameters (the dynamic code scanner will not attack HTTP parameters, such as integers, that cannot be injected with an attack); and audit only HTTP parameters with static vulnerabilities that can be correlated to the dynamic vulnerabilities.

In one embodiment, static code analysis and dynamic code analysis are operated collaboratively. The static code scanner discovers an attack surface of HTTP APIs, thereby simplifying the dynamic scan configuration, reducing omitted attack surfaces, and reducing static false positives because API functions that are unreachable via API and are not vulnerable to HTTP attacks. Thus, dynamic code analysis is able to eliminate any futile attacks and identify attack surfaces and attack path parameters. Dynamic code analysis can thus provide dynamic confirmation of static vulnerabilities.

In another embodiment, vulnerabilities that are determined to have correlated counterparts in both static and dynamic result sets are then concluded to not be false-positives, while uncorrelated counterparts are more likely false positives and, as a result, excluded from subsequent attack-testing. The correlated vulnerabilities may be prioritized higher because they are not false positives and source location is known, which may then be designated for further testing and/or modification to address the vulnerability. Vulnerabilities that are correlated with a reachable linked source are probably not false positives because reachable functions are potentially vulnerable to attack, whereas non-reachable functions are not.

In another embodiment, the combination of dynamic and static code analysis, described herein, increases audit precision by using server framework information, enables applicable framework specific checks, and disables non-applicable framework specific checks.

In one embodiment, a system for training a dynamic analysis component with a configuration generated by a static analysis component is disclosed, comprising: at least one processor of a number of processors that accesses instructions maintained in a non-transitory memory, that, when executed by the at least one processor of the number of processors processor, cause the at least one processor of the number of processors to: access a source code to be evaluated for attack vulnerabilities; determine a first set of code portions of the source code that are previously determined to be not susceptible to any attack of a set of attacks; determine a second set of code portions of the source code that are previously determined to be susceptible to at least one attack of the set of attacks; generate a configuration file identifying the second set of code portions and omitting the first set of code portions; and configure at least one of the number of processors to execute an executable form of the source code with the configuration file, wherein the execution of the executable form of the source code further comprises executing the at least one attack of the set of attacks in accordance with the configuration file and omitting execution of any attack omitted from the configuration file.

In another embodiment, a method, for training a dynamic analysis component with a configuration generated by a static analysis component is disclosed, comprising: accessing a source code to be evaluated for attack vulnerabilities; determining a first set of code portions of the source code that are previously determined to be not susceptible to any attack of a set of attacks; determining a second set of code portions of the source code that are previously determined to be susceptible to at least one attack of the set of attacks; and generating a configuration file identifying the second set of code portions and omitting the first set of code portions; and configuring a processor to execute an executable form of the source code with the configuration file wherein the execution of the executable form of the source code further comprises executing the at least one attack of the set of attacks in accordance with the configuration file and omitting execution of any attack omitted from the configuration file.

In another embodiment, a system for training a dynamic analysis component with a configuration generated by a static analysis component is disclosed, comprising: means to access a source code to be evaluated for attack vulnerabilities; means to determine a first set of code portions of the source code that are previously determined to be not susceptible to any attack of a set of attacks; means to determine a second set of code portions of the source code that are previously determined to be susceptible to at least one attack of the set of attacks; and means to generate a configuration file identifying the second set of code portions and omitting the first set of code portions; and means to configure a processor to execute an executable form of the source code with the configuration file wherein the execution of the executable form of the source code further comprises executing the at least one attack of the set of attacks in accordance with the configuration file and omitting execution of any attack omitted from the configuration file.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware , an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 2 depicts a data flow in accordance with embodiments of the present disclosure;

FIG. 5 depicts a code sample and discovered attack vectors of an attack surface in accordance with embodiments of the present disclosure.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference to one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
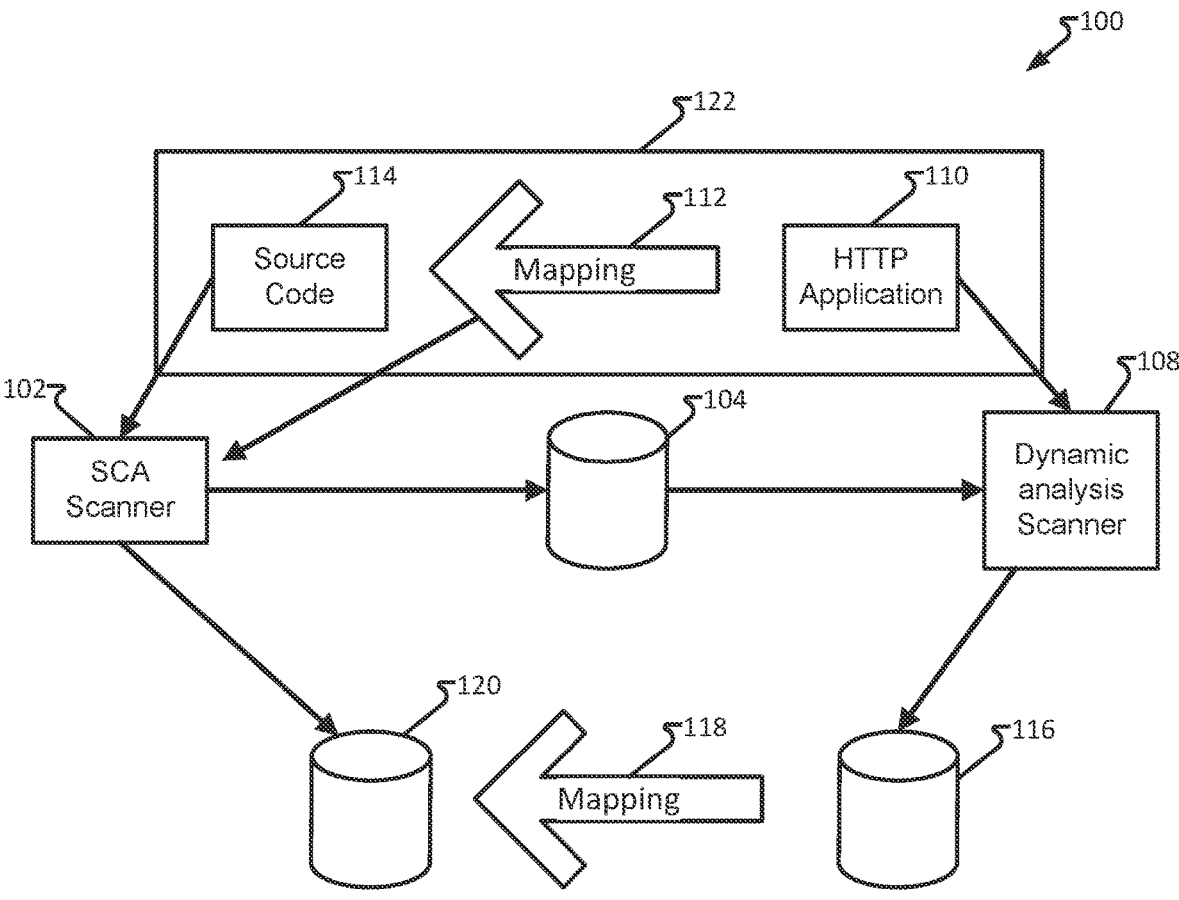
FIG. 1 depicts a system in accordance with embodiments of the present disclosure.

FIG. 1 depicts system 100 in accordance with embodiments of the present disclosure. System 100 illustrates processes of at least one computing device comprising at least one processor (e.g., a single core microprocessor, a multi-core microprocessor, blade, array, server, processor as a service (e.g., "cloud" processor), etc.) comprising or accessing at least one data storage device (e.g., internal storage device, external storage device, storage array, storage as a service (e.g., "cloud" storage), etc.). Embodied wherein a plurality of computing devices and/or storage devices are utilized, each thereof comprises a network interface to a network (not shown) to communicate therebetween.

In one embodiment, source code analysis scanner 102 analyzes source code 114 of application 122. Application 122 may be embodied as a client-server web application, such that HTTP application 110 is executed by a client, such as a user's computer executing a web browser or other application. Dynamic analysis scanner 108 may be embodied to appear as a client and execute HTTP application 110 as intended, as well as not intended. For example, to execute XSS and/or other attacks to mimic the actions that a malicious client may take in order to provide or obtain unauthorized data to or from the server application (e.g., an executable form of source code 114). If such malicious actions are successful, the vulnerability is determined to be present and may be further identified for resolution. If such malicious actions are not successful, the vulnerability is not present and may be identified as successfully able to thwart a particular attack or attacks. In another embodiment, mapping 112 associates specific functions of source code 114 with the corresponding specific functions of HTTP application 110 (as will be discussed more completely with respect to FIG. 2). However, mapping 112 may not be 1-to-1, as HTTP application 110 may call a non-existent function of source code 114, which may result in an error or source code 114 may comprise a function that is unused by HTTP application 110 (e.g., unreachable code). Mapping 112 may be provided as an input to source code analysis scanner 102 and/or discovered by source code analysis scanner 102.

Configuration file 104 is output from source code analysis scanner 102 and, in one embodiment, comprises the attack surface for application 122. In another embodiment, other inputs are provided to configuration file 104 may be provided in addition to source code analysis scanner 102, such as to direct dynamic analysis scanner 108 to direct testing resources to particular portions of source code 114. In one embodiment, source code analysis scanner 102 identifies vulnerabilities that match a previously determined pattern, include a function previously determined to present a vulnerability (e.g., all HTML functions with a request parameter), etc.

In another embodiment, source code analysis scanner 102 identifies code portions of source code 114 that may be excluded from dynamic testing by dynamic analysis scanner 108. For example, one input to source code analysis scanner 102 may be an indicia of a framework, such as Active Server Pages (ASP), that source code 114, or an executable version (e.g., complied, linked, interpreted, etc.) of source code 114 will execute on. If source code analysis scanner 102 determines that a vulnerability is not possible with the particular framework, indicia of the vulnerability may be omitted from configuration file 104 to cause dynamic analysis scanner 108 to omit testing a vulnerability that is non-existent based on the indicated framework. Similarly, a datatype, such as in a request parameter may not be able to be attacked in any form or with regard to a particular form, such as an integer being immune to an XSS attack. As a result, source code analysis scanner 102 may omit identification of particular vulnerabilities from configuration file 104, to then be omitted by dynamic analysis scanner 108. In another embodiment, any vulnerability that is solely located in unreachable code of source code 114, that is, no processing path of source code 114 will allow a code portion comprising a known vulnerability to be executed, may similarly be excluded form configuration file 104. Code may be entirely unreachable (e.g., legacy code that is never used), unreachable based on a static value (e.g., a source code constant, such as "debug=FALSE") that is determined by source code 114 and, as a result, executable code (e.g., code that executes a function with a known vulnerability when "debug" is "TRUE"), is therefore not reachable in executable form. Additional conditions may be based on a set hardware or software platform or other condition known prior to execution of source code analysis scanner 102 that will cause a code portion comprising a known or determined vulnerability to be unreachable and, as a result, omitted from configuration file 104.

Configuration file 104 may be embodied as one or more of a file in a database or data structure maintained in a memory of one or more devices, such as source code analysis scanner 102, dynamic analysis scanner 108, or a storage device discrete therefrom. Source code analysis scanner 102 may further write static vulnerability set 120, which may be maintained with or separate from source code analysis scanner 102 in a data storage device, memory structure, and/or other data storage component. Static vulnerability set 120 may include all identified vulnerabilities, such as with indica of the type of vulnerability (e.g., "unreachable/not a vulnerability", "subject to XSS attack," etc.).

Configuration file 104 is read by dynamic analysis scanner 108 for execution. In one embodiment, dynamic analysis scanner 108 is embodied as, or as a portion of, WebInspect by Micro Focus®. In one embodiment, dynamic analysis scanner 108 mimics a client device executing HTTP application 110 with malicious intent to obtain/provide unauthorized data (e.g., information, commands, etc.) to a host application interacting with HTTP application 110. As a result, a number of attacks are generated for execution. The attacks may be generated based on a desired level of completeness (e.g., test each value of a Boolean, test fifty randomly selected values of all possible integer values, etc.), datatype-vulnerability determined attack (e.g., a request parameter string being subject to XSS attacks), buffer overflow, etc. As a benefit of configuration file 104, and the data therein, dynamic analysis scanner 108 omits testing unreachable code/functions, omits performing attacks on non-vulnerable datatypes, omits performing attacks that require a specific application framework that differs from the current application framework, or any other attack previously determined to be a vulnerability by source code analysis scanner 102 but not applicable, and therefore omitted, from configuration file 104.

In another embodiment, dynamic analysis scanner 108 produces dynamic vulnerability set 116 comprising observed vulnerabilities, for example, attacks that were successful, in whole or in part, to obtain or write unauthorized data to the host. The members of static vulnerability set 120 that correspond to members of dynamic vulnerability set 116 represent verified vulnerabilities and should be addressed before application 122 has the potential to be used by a party that may exploit the vulnerability.

As an example of system 100, source code 114 comprises source code with four functions: f1(int a1, int a2); f2(string a3, int a4); f3(string a5, string a6); and f4(string a7, string a8). HTTP application 110 comprises three function calls to (an executable form of source code 114), such as "u1/(a1, a2)"; "u2/(a3, a4)"; "u3(a5,a6)" (it should be appreciated that fully qualified pathnames are also contemplated but not permitted in patent documents and therefore omitted). In this example, "u1" is the URL to call "f1"; "u2" is the URL to call "f2"; and "u3" si the URL to call "f3". The function "f4" is not called and, as a result, unreachable and omitted by source code analysis scanner 102 from configuration file 104 and subsequent testing. Testing function "f1", such as with an XSS attack, is futile as the only parameters "f1" takes are integers and, as a result inserting a string to form an XSS attack will be futile and is excluded.

FIG. 2 depicts data flow 200 in accordance with embodiments of the present disclosure. In one embodiment, data flow 200 summarizes operations of at least one processor configured with instructions maintained in a non-transitory memory to perform data flow 200. Block 202 illustrates analysis results from source code analysis scanner 102, wherein particular vulnerability (e.g., "XSS" attack vulnerability) for portions of source code 114 (e.g., requests "r2", "r2" and "r3") and detected as static vulnerabilities (e.g., "sv2", "sv2", and "sv3").

Block 204 illustrates dynamic analysis, such as the operations of dynamic analysis scanner 108. The dynamic analysis detects dynamic vulnerabilities (e.g., "dv2," "dv2", and "dv3") for requests (e.g., "r1", "r4", and "r5"). The dynamic analysis may determine a static vulnerability (e.g., request "r2" using parameter "x") exists, but the dynamic analysis performs the tests/attacks and finds no vulnerability. Similarly, if a parameter is absent (e.g., "y") it is therefore not tested and represents unreachable code.

Block 206 illustrates the determination of a correlation of a vulnerability determined during the static analysis (e.g., "sv1") and a vulnerability determined during the dynamic analysis (e.g., "dv1"). Data flow 200 continues as illustrated by off-page connector 208 and continues at block 210. Block 210 integrates the static and dynamic results, such as may be maintained in static vulnerability set 120 and dynamic vulnerability set 116, respectively. For example, a vulnerability (e.g., "sv1" and "dv1") may be determined, static false positives and/or dynamic false negatives (e.g., "sv2"

and "dv2) may be determined, dynamic false negatives (e.g., "sv3") determined, and/or static analysis false negatives (e.g., "dv2" and "dv3") are determined.

Figure 3:
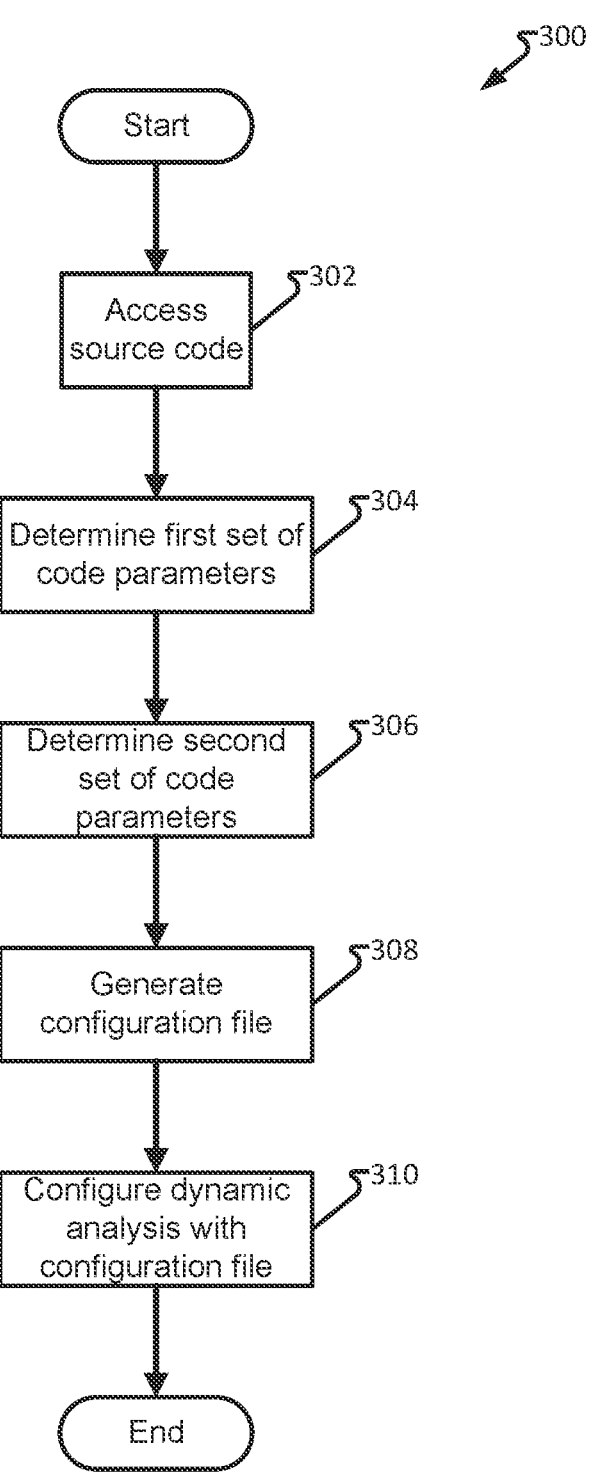
FIG. 3 depicts a first process in accordance with embodiments of the present disclosure.

FIG. 3 depicts process 300 in accordance with embodiments of the present disclosure. In one embodiment, process 300 may embodied as machine-readable instructions maintained in a non-transitory memory of at least one processor, such as at least one processor executing source code analysis component, such as source code analysis scanner 102 and/or dynamic analysis component, such as dynamic analysis scanner 108. Process 300 begins and, at step 302 accesses source code to be evaluated via static analysis for static vulnerabilities.

Step 304 determines first set of code parameters, such as code that is not reachable. Code may be unreachable due to extraneous code (e.g., never reachable under any condition), or conditionally unreachable, such as when the condition is known with certainty prior to execution (e.g., the value of a static variable, the target framework, etc.). Step 306 determines a second set of code parameters, such as datatypes (e.g., string, integer, etc.) that may be previously determined to be vulnerable or not vulnerable to any of one or more types of attack. Step 308 generates a configuration file, such as to configure dynamic analysis scanner 108, in step 310, to perform dynamic analysis of the corresponding executable portions of the application.

Figure 4:
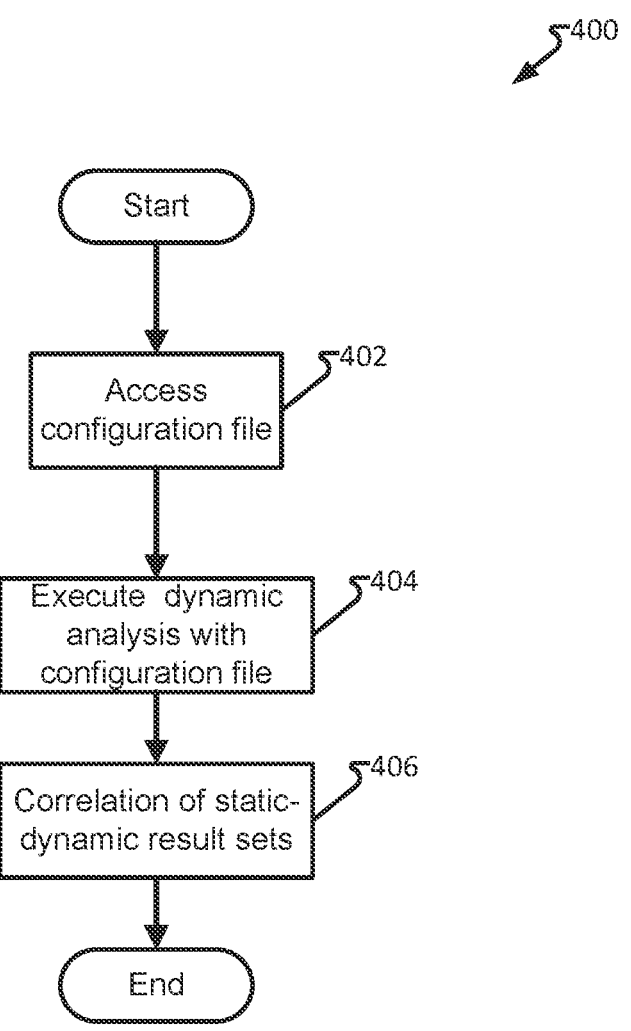
FIG. 4 depicts a second process in accordance with embodiments of the present disclosure.

FIG. 4 depicts process 400 in accordance with embodiments of the present disclosure. In one embodiment, process 400 may embodied as machine-readable instructions maintained in a non-transitory memory of at least one processor, such as at least one processor executing source code analysis scanner 102 and/or dynamic analysis scanner 108. In one embodiment, process 400 begins and, if not already performed, step 402 accesses a configuration file (e.g., see FIG. 3, step 308) and configures the dynamic analysis component, such as dynamic analysis scanner 108. Step 404 executes the analysis, such as comprising attacks selected in accordance with elements of the configuration file and excluding tests that are vulnerabilities in the source code but were omitted from the configuration file by source code analysis scanner 102. Step 406 then correlates the vulnerabilities discovered in the dynamic analysis with the vulnerabilities discovered in the static analysis.

For each static vulnerability determined by source code analysis scanner 102, there are three possible results: (1) source code analysis scanner 102 outputs an entry to static vulnerability set 120 is correlated a corresponding vulnerability entry in dynamic vulnerability set 116. As a result, the vulnerability is confirmed; (2) source code analysis scanner 102 outputs an entry to static vulnerability set 120 that is not dynamically detected by dynamic analysis scanner 108, and therefore identified in, or omitted from, dynamic vulnerability set 116 as not a vulnerability. As a result, the vulnerability is either a static false positive or a dynamic false negative; or (3) source code analysis scanner 102 outputs an entry to static vulnerability set 120 is not correlated to an entry in dynamic vulnerability set 116, as the vulnerability was not dynamically detected. As a result, the vulnerability is either a static false positive or a dynamic false negative. When a dynamic false negative, the cause may originate from dynamic crawl coverage failure due to a vulnerability absent from configuration file 104.

FIG. 5 depicts code sample 500 and discovered attack vectors 502 of an attack surface. In the example illustrated, dynamic analysis scanner 108 may utilize the discovered attack vectors 502 to omit certain attacks, such as SQL and XSS injection attacks on this URL, because the parameters of the invocation are not of the data type that can be vulnerable to such attacks. As a result, the performance of such unnecessary tests are omitted.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system.

Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for training a dynamic analysis component with a configuration generated by a static analysis component, comprising:

at least one processor of a number of processors that accesses instructions maintained in a non-transitory memory that, when executed by the at least one processor of the number of processors, causes the at least one processor of the number of processors to:

access a source code to be evaluated for attack vulnerabilities;

determine a first set of code portions of the source code that are previously determined to be not susceptible to any attack of a set of attacks;

determine a second set of code portions of the source code that are previously determined to be susceptible to at least one attack of the set of attacks;

generate the configuration as a configuration file identifying the second set of code portions and omitting the first set of code portions;

configure at least one of the number of processors to execute an executable form of the source code with the configuration file, wherein execution of the executable form of the source code further comprises executing the at least one attack of the set of attacks in accordance with the configuration file and omitting execution of any attack omitted from the configuration file;

execute the static analysis component and, as portions thereof, perform the accessing of the source code, determine the first set of code portions, determine the second set of code portions, and generate the configuration file; and execute the dynamic analysis component and, as portions thereof, perform the execution of the executable form of the source code.

2. The system of claim 1, wherein the at least one of the number of processors further performs executing the executable form of the source code, comprising executing the at least one attack of the set of attacks.

3. The system of claim 1, wherein the at least one of the second set of code portions comprise a Hypertext Transfer Protocol (HTTP) request parameter.

4. The system of claim 1, wherein the at least one of the number of processors performs the determination of the first set of code portions of the source code that are previously determined to be not susceptible to any attack of the set of attacks, comprising determining at least one code portion of the first set of code portions, utilizes a data type that is incompatible with each of the set of attacks.

5. The system of claim 1, wherein the at least one of the number of processors performs the determination of the first set of code portions of the source code that are previously determined to be not susceptible to any attack of the set of attacks, comprising determining at least one code portion of the first set of code portions is unreachable in the executable form of the source code.

6. The system of claim 2, wherein the at least one of the number of processors further performs, as an output to the execution of the executable form of the source code, indicia of vulnerability associated with each of the second set of code portions, each of the at least one attack of the set of attacks, and indicia of success of the at least one attack of the set of attacks.

7. The system of claim 3, wherein the HTTP request parameter comprises at least one of a Uniform Resource Locator (URL), a header, a website cookie, HTTP POST data, HTTP GET data, and query data.

8. The system of claim 5, wherein the at least one of the number of processors determines the at least one code portion of the first set of code portions is unreachable in the executable form of the source code upon determining the executable form of the source code is associated with a specific platform that causes the at least one code portion of the first set of code portions to be unreachable.

9. A method for training a dynamic analysis component with a configuration generated by a static analysis component, comprising:

accessing a source code to be evaluated for attack vulnerabilities;

determining a first set of code portions of the source code that are previously determined to be not susceptible to any attack of a set of attacks;

determining a second set of code portions of the source code that are previously determined to be susceptible to at least one attack of the set of attacks;

generating the configuration as a configuration file identifying the second set of code portions and omitting the first set of code portions; and configuring a processor to execute an executable form of the source code with the configuration file, wherein execution of the executable form of the source code further comprises executing the at least one attack of the set of attacks in accordance with the configuration file and omitting execution of any attack omitted from the configuration file, wherein the static analysis component performs accessing of the source code, determining the first set of code portions, determining the second set of code portions, and generating the configuration file, wherein the dynamic analysis component performs the execution of the executable form of the source code;

wherein a first processor accesses instructions maintained in non-transitory memory that when read by the first processor cause the first processor to execute the static analysis component; and wherein a second processor accesses instructions maintained in non-transitory memory that when read by the second processor cause the second processor to execute the dynamic analysis component.

10. The method of claim 9, wherein the processor further performs executing the executable form of the source code, comprising executing the at least one attack of the set of attacks.

11. The method of claim 9, wherein the at least one of the second set of code portions comprise a Hypertext Transfer Protocol (HTTP) request parameter.

12. The method of claim 9, wherein the first set of code portions of the source code that are previously determined to be not susceptible to any attack of the set of attacks, comprise determining at least one code portion of the first set of code portions, utilizes a data type that is incompatible with each of the set of attacks.

13. The method of claim 9, wherein the determination of the first set of code portions of the source code that are previously determined to be not susceptible to any attack of the set of attacks, comprise determining at least one code portion of the first set of code portions is unreachable in the executable form of the source code.

14. The method of claim 10, wherein the processor further performs, as an output to the execution of the executable form of the source code, indicia of vulnerability associated with each of the second set of code portions, each of the at least one attack of the set of attacks, and indicia of success of the at least one attack of the set of attacks.

15. The method of claim 11, wherein the HTTP request parameter comprises at least one of a Uniform Resource Locator (URL), a header, a website cookie, HTTP POST data, HTTP GET data, and query data.

16. The method of claim 13, wherein the at least one code portion of the first set of code portions is unreachable in the executable form of the source code upon determining the executable form of the source code is associated with a specific platform that causes the at least one code portion of the first set of code portions to be unreachable.

17. A non-transitory computer readable medium comprising instructions that, when read by a processor, cause the processor to perform:

accessing a source code to be evaluated for attack vulnerabilities;

determining a first set of code portions of the source code that are previously determined to be not susceptible to any attack of a set of attacks;

determining a second set of code portions of the source code that are previously determined to be susceptible to at least one attack of the set of attacks;

generating a configuration file identifying the second set of code portions and omitting the first set of code portions;

configuring a processor to execute an executable form of the source code with the configuration file, wherein execution of the executable form of the source code further comprises executing the at least one attack of the set of attacks in accordance with the configuration file and omitting execution of any attack omitted from the configuration file, and executing a static analysis component and, as portions thereof, performs accessing of the source code, determining the first set of code portions, determining the second set of code portions, and generating the configuration file; and executing a dynamic analysis component and, as portions thereof, performs the execution of the executable form of the source code.

18. The non-transitory computer readable medium of claim 17, wherein the instructions to configure the processor further comprise instructions to cause the processor to execute the at least one attack of the set of attacks and output, as a result of the execution of the executable form of the source code, indicia of vulnerability associated with each of the second set of code portions, each of the at least one attack of the set of attacks, and indicia of success of the at least one attack of the set of attacks.

* * * * *